(12) United States Patent
Anstis et al.

(10) Patent No.: US 10,011,440 B2
(45) Date of Patent: Jul. 3, 2018

(54) TIPPING ACTUATOR FOR A CONVEYOR SYSTEM

(71) Applicant: COMPAC TECHNOLOGIES LIMITED, Hamilton (NZ)

(72) Inventors: Isaac James Anstis, Hamilton (NZ); Simon Richardson, Hamilton (NZ); Sam Voschezang, Hamilton (NZ); Sheldon Phillip White, Hamilton (NZ)

(73) Assignee: COMPAC TECHNOLOGIES LIMITED, Hamilton (NZ)

( * ) Notice: Subject to any disclaimer, the term of this patent is extended or adjusted under 35 U.S.C. 154(b) by 0 days.

(21) Appl. No.: 15/354,757

(22) Filed: Nov. 17, 2016

(65) Prior Publication Data

US 2017/0190517 A1 Jul. 6, 2017

Related U.S. Application Data

(63) Continuation of application No. 14/426,528, filed as application No. PCT/NZ2013/000157 on Sep. 4, 2013, now Pat. No. 9,527,680.

(30) Foreign Application Priority Data

Sep. 4, 2013 (WO) ................ PCT/NZ2013/000157

(51) Int. Cl.
*B65G 47/96* (2006.01)
*B65G 47/38* (2006.01)

(52) U.S. Cl.
CPC ........... *B65G 47/962* (2013.01); *B65G 47/38* (2013.01); *B65G 2201/0211* (2013.01)

(58) Field of Classification Search
CPC .............................. B65G 47/962; B65G 47/38
See application file for complete search history.

(56) References Cited

U.S. PATENT DOCUMENTS

| 3,034,665 A * | 5/1962 | Speaker ............... B65G 47/962 198/349.6 |
| 3,167,192 A * | 1/1965 | Harrison ................ B07C 3/082 198/349 |

(Continued)

FOREIGN PATENT DOCUMENTS

| AU | 701354 B2 | 1/1999 |
| EP | 0173399 A1 | 3/1986 |

(Continued)

OTHER PUBLICATIONS

International Search Report and Written Opinion dated Jan. 2, 2014 in International Patent Application No. PCT/NZ2013/000157, 18 pages.

(Continued)

*Primary Examiner* — Thomas Randazzo
(74) *Attorney, Agent, or Firm* — Vierra Magen Marcus LLP

(57) ABSTRACT

The invention relates to a tipping actuator for a conveyor system that comprises a plurality of article carriers moving on an endless conveyor in a conveying direction, each article carrier having a carrier frame for bearing an article, the carrier frame being pivotally mounted on the article carrier and operable to tip to enable discharge of the article borne on the carrier frame. The tipping actuator comprises a trigger member for contacting the article carriers to tip them and is configured such that, when in a non-contact position, the article carriers are able to at least partly tip towards the trigger member such that the contact portion of the trigger member is received by a portion of the article carrier. In another embodiment, a contact portion of the trigger is sloped with two different gradients. An electromagnet may be used to cause actuation of the trigger. The tipping actuator may be able to allow tipping in opposite directions of (Continued)

adjacent carriers, for example in some embodiments the trigger may be formed of upstream and downstream parts.

34 Claims, 11 Drawing Sheets

(56) References Cited

U.S. PATENT DOCUMENTS

| | | | |
|---|---|---|---|
| 3,510,014 | A | 5/1970 | Speaker |
| 3,662,874 | A | 5/1972 | Muller |
| 4,174,773 | A | 11/1979 | Venzke |
| 4,585,126 | A | 4/1986 | Paddock |
| 4,595,091 | A | 6/1986 | Scopatz |
| 4,744,454 | A | 5/1988 | Polling |
| 5,267,654 | A | 12/1993 | Leverett |
| 5,372,234 | A | 12/1994 | Fortenbery |
| 5,433,311 | A | 7/1995 | Bonnet |
| 5,497,887 | A * | 3/1996 | Hiebert ............... B07C 5/36 198/370.02 |
| 5,626,236 | A | 5/1997 | Hiebert |
| 5,651,446 | A | 7/1997 | Affeldt |
| 6,009,992 | A | 1/2000 | Erceg |
| 6,193,074 | B1 | 2/2001 | Baum |
| 6,234,297 | B1 | 5/2001 | Blanc |
| 6,311,848 | B1 * | 11/2001 | Zenzerovich ........ B65G 47/962 198/370.01 |
| 6,367,610 | B1 | 4/2002 | Fortenbery |
| 6,382,392 | B1 | 5/2002 | Fortenbery |
| 6,502,687 | B1 | 1/2003 | Ayen |
| 7,410,044 | B2 | 8/2008 | Kennedy |
| 8,807,320 | B2 * | 8/2014 | Fortenbery ......... B65G 47/962 198/370.03 |
| 9,527,680 | B2 * | 12/2016 | Anstis ..................... B07C 5/36 |

FOREIGN PATENT DOCUMENTS

| | | |
|---|---|---|
| FR | 2924700 A1 | 6/2009 |
| GB | 2124573 A | 2/1984 |
| JP | 2009018902 A | 1/2009 |
| NZ | 523931 A | 6/2005 |
| WO | 9622932 A2 | 8/1996 |
| WO | 2014038960 A1 | 3/2014 |

OTHER PUBLICATIONS

International Preliminary Report on Patentability dated Mar. 19, 2015 in International Patent Application No. PCT/NZ2013/000157, 11 pages.
European Search Report dated Mar. 29, 2016 in European Patent Application No. 13835475.8, 6 pages.
Notice of Allowance dated Aug. 18, 2016 in U.S. Appl. No. 14/426,528, 22 pages.
Non-Final Rejection dated Mar. 4, 2016 in U.S. Appl. No. 14/426,528, 35 pages.
Preliminary Amendment dated Mar. 6, 2015 in U.S. Appl. No. 14/426,528, 8 pages.
Amendment filed Jun. 6, 2016 in U.S. Appl. No. 14/426,528, 13 pages.

* cited by examiner

TIPPING ACTUATOR FOR A CONVEYOR SYSTEM

CLAIM OF PRIORITY

This application is a continuation of and claims priority to U.S. application Ser. No. 14/426,528 filed Mar. 6, 2015, entitled "TIPPING ACTUATOR FOR A CONVEYOR SYSTEM", which claims priority to and is a 371 national stage application of PCT/NZ2013/000157, having an international filing date of Sep. 4, 2013, which claims the benefit of priority to NZ 602280, filed Sep. 6, 2012, the entirety of which is incorporated herein by reference.

FIELD OF INVENTION

The invention relates to tipping actuators for conveyor systems and improvements in such devices and their operability.

BACKGROUND TO THE INVENTION

Conveyors are often used in grading machines to transport articles through various measurement stages and to discharge the articles to sort them dependent on the measurements. Such conveyors usually include an endless chain or belt on which are mounted a plurality of article carriers or cups. A discharge mechanism is used to unload objects at certain points along the conveyor.

A common type of object that is graded and sorted by such a conveyor system is fruit. Fruit may be sorted based on criteria such as weight, shape, colour, ripeness and any other characteristic. Conveyor systems comprise devices to measure these characteristics while the fruit is being transported. The position of each fruit and its respective characteristics can be tracked so that a discharge mechanism causes items of fruit to be unloaded from the conveyor and sent to the required destination, for example towards a chute or onto another conveyor.

The applicant's own U.S. Pat. No. 7,410,044 discloses an article carrier suitable to be mounted to a conveyor and used to sort fruit in a sorting assembly. A carrier frame is pivotable between a carriage position, in which fruit may be supported on the carrier frame, and a discharge position, in which fruit may fall off the carrier frame under gravity and thereby be discharged from the article carrier. The carrier frame has contact surfaces that may be contacted by an actuator when the carrier frame is in the carriage position to cause the carrier frame to tip into the discharge position and cause a fruit on the carrier frame to be unloaded. Advantageously the carrier frame can tip in both sideways directions so that fruit can be discharged to either side.

A latch or locking member is engaged to the carrier frame and moveable between two positions in order to lock the carrier frame in position or to unlock the carrier frame and thus allow it to pivot on the article carrier.

In one version of an existing system, the actuator comprises a solenoid which, when activated, causes a pivotal trigger member to flick upwards before falling under gravity. Activation is timed so that the trigger member impacts one of the contact surfaces of the locking member, causing it to move to the unlocked position and further to transfer the impact to the carrier frame, causing the carrier frame to tip. This mechanism requires a significant amount of energy to flick the trigger upwards, which is transmitted to the latch which engages the delatching mechanism to thereupon transfer the force to the carrier frame. These series of impacts makes the conveyor system very noisy, particularly where multiple tipping actuator mechanisms are operating simultaneously. Furthermore, the impact can have a different effect on fruit of different weights. Light fruit may be caused to jump off the article carrier rather than merely tipping off. This can damage fruit and also may cause the fruit to fall or bounce somewhere other than is intended. In contrast, the force of the impact may not be sufficient to tip the carrier frame at all if it is carrying heavy fruit. Another drawback of the existing trigger mechanism is that there is a narrow window of opportunity for the trigger to be activated and to impact the carrier frame correctly. This increases the complexity in the control system and means errors in fruit discharge can easily occur where the window is missed.

The tipping trigger mechanism on MAF's Genesis conveyor system comprises a generally triangular-shaped trigger plate that has a default position laterally outside the article carriers on the conveyor. The trigger can be moved inwardly where the upper surface of the plate comes into contact with an article carrier, causing it to tip away from the trigger. The trigger is actuated by a solenoid and a spring biases the trigger back to the default position once the solenoid is de-activated. When used with light fruit, the trigger may cause the article carrier to tip violently, and therefore risks the fruit bouncing off erratically. Furthermore, the trigger is only able to accommodate the carrier tipping away from the trigger, which reduces flexibility in the design of the conveyor system. Another problem with the MAF system is that the spring mechanism to return the trigger to the default position can wear out over the course of repeated use.

OBJECT OF THE INVENTION

It is an object of the invention to provide an improved tipping actuator for a conveyor system. Alternatively, it is an object to provide an improved conveyor system. Alternatively, it is an object of the invention to address one or more of the disadvantages of prior tipping actuators and conveyor systems, such as those described above. Alternatively, it is an object of the invention to at least provide the public with a useful choice.

SUMMARY OF THE INVENTION

According to a first aspect of the invention, there is provided a tipping actuator for a conveyor system, the conveyor system comprising a plurality of article carriers moving on an endless conveyor in a conveying direction, each article carrier having a carrier frame for bearing an article, the carrier frame being pivotally mounted on the article carrier and operable to tip to enable discharge of the article borne on the carrier frame, the tipping actuator comprising:
 a trigger member having a contact portion for contacting the article carriers; and
 an actuation mechanism operable to move the trigger member between a non-contact position, in which the contact portion is positioned out of the path of the article carriers so as to avoid contact therewith, and a contact position, in which the contact portion is positioned in the path of the article carriers to make contact therewith and effect tipping thereof away from the trigger member,
 wherein the trigger member is configured such that, when in the non-contact position, the article carriers are able to at least partly tip towards the trigger member such that the contact portion of the trigger member is received by a portion of the article carrier.

This allows for a compact conveyor system and means the trigger member moves only a small distance between the contact and non-contact positions.

More preferably, the trigger member is configured such that, when in the non-contact position, the article carriers are able to tip only partly towards the trigger member prior to contacting the trigger member, the article carriers being able to tip fully once conveyed past the trigger member. A partial tipping of an article carrier followed by a full tipping is a more gentle movement than a direct full tipping.

Preferably, the actuation mechanism is operable to move at least part of the trigger member laterally between the non-contact and contact positions. It will be understood that such a "lateral" movement of the trigger member includes movements in which the trigger member rotates around a pivot but the rotation is sufficiently small that the upper edge of the trigger member moves generally horizontally. A lateral movement is beneficial from the perspective of timing actuation of the trigger. Other lateral movements incorporating a sliding or more complex mechanism may also be used.

In some embodiments of the invention, the trigger member comprises a recess in an upstream portion thereof in relation to the conveying direction. More preferably, the recess is configured such that trigger member avoids contacting the article carrier when the trigger member is in the contact position and one of the article carriers has moved just past a downstream portion of the trigger member. In one embodiment, the recess may be shaped to compliment the shape of a part of the carrier frame. This feature allows tolerance of a greater error in the timing of actuation of the trigger member into the contact position.

Throughout this description, the terms "upstream" and "downstream" will be used to indicate relative positions of components relative to the direction of travel of the conveyor, which is assumed to be moving in the downstream direction.

In some exemplary embodiments, the trigger member is coupled to the actuation mechanism at an upstream portion thereof. For example, the trigger member may be generally hook-shaped with the point of the hook extending in the downstream direction.

In some embodiments of the invention, the tipping actuator is operable to allow a first article carrier on the endless conveyor to be or have been tipped towards the trigger member and to effect tipping of a second consecutive article carrier on the endless conveyor away from the trigger member, the second consecutive article carrier being the article carrier on the endless conveyor immediately following the first article carrier.

In said embodiments, the trigger member preferably comprises upstream and downstream trigger member parts, each trigger member part being configured to effect tipping of the article carriers if positioned in their path, wherein the upstream trigger member part is able to move into the contact position upon actuation of the actuation mechanism if the downstream trigger member part is constrained from moving into the contact position. For example, the downstream trigger member may be constrained by the article carrier when tipped towards the trigger member or otherwise constrained, for example, if the article carrier is in the carry position wherein the upstream trigger can advantageously gain the position required to make an effective tip on the consecutive article carrier.

The tipping actuator may comprise a ramp located upstream of the trigger member and configured to move an article carrier from an article discharge (tipped) position into an article carriage (non-tipped) position.

According to a second aspect of the invention, there is provided a tipping actuator for a conveyor system, the conveyor system comprising a plurality of article carriers moving on an endless conveyor in a conveying direction, each article carrier having a carrier frame for bearing an article, the carrier frame being pivotally mounted on the article carrier and operable to tip to enable discharge of the article borne on the carrier frame, the tipping actuator comprising:

trigger means having at least one contact portion for contacting the article carriers; and trigger actuation means operable to move the trigger means into a contact position, in which the contact portion(s) is positioned in the path of the article carriers to make contact therewith and effect tipping thereof, wherein the contact portion(s) comprises at least one contact surface sloped towards the conveying direction and having at least two gradients.

Preferably, the trigger means comprises one sloped contact surface, the sloped contact surface having at least two gradients.

Preferably, the sloped contact surface comprises at least a first section and a second section, the first section being located upstream of the second section in relation to the conveying direction, the first section having a steeper gradient than the second section.

In some embodiments of the invention, at least part of the sloped contact surface of the contact portion is curved. For example, the first and/or second section may be curved.

In some embodiments of the invention, the first and/or second section may be substantially straight. The sloped contact surface may comprise a curved transition section between the first and second sections.

Preferably, the trigger means is configured such that, when a first contact surface contacts the article carrier, a locking member of the article carrier is lifted from a locked position, in which the carrier frame is unable to pivot on the article carrier, into an unlocked position, in which the carrier frame is able to pivot on the article carrier. More preferably, the trigger means is configured such that, when a second contact surface contacts the article carrier, the carrier frame is tipped from the second article carriage position into an article discharge position.

In some embodiments of the invention, the tipping actuator comprises upstream and downstream trigger member parts, each trigger member part being configured to effect tipping of the article carriers if positioned in their path, wherein the upstream trigger member part is able to move into the contact position upon actuation of the actuation mechanism if the downstream trigger member part is constrained from moving into the contact position. For example, the downstream trigger member may be constrained by the article carrier when tipped towards the trigger member.

More preferably, each trigger member part comprises at least one contact surface for contacting the article carriers sloped towards the conveying direction and having at least two gradients.

The upstream and downstream trigger member parts may be independently operable.

According to a third aspect of the invention, there is provided a tipping actuator for a conveyor system, the conveyor system comprising a plurality of article carriers moving on an endless conveyor in a conveying direction, each article carrier having a carrier frame for bearing an article, the carrier frame being pivotally mounted on the article carrier and operable to tip to enable discharge of the article borne on the carrier frame, the tipping actuator comprising:

a trigger member having a contact portion for contacting the article carriers; and an armature coupled to the trigger member, the armature comprising or having mounted thereon an armature magnet; and an electromagnet comprising a core;

wherein the electromagnet is switchable between on and off states to cause the armature magnet to be attracted to and repelled from the electromagnet, movement of the armature causing the trigger member to move between a contact position, in which the contact portion is positioned in the path of the article carriers to make contact therewith and effect tipping thereof, and a non-contact position, in which the contact portion is positioned out of the path of the article carriers so as to avoid contact therewith.

Preferably, a portion of the trigger member comprises the armature.

More preferably, the trigger member is pivotally mounted and configured to pivot on activation/deactivation of the electromagnet.

In some exemplary embodiments of the invention, the trigger member is pivotally mounted to pivot around a substantially horizontal axis.

In one embodiment, the trigger member comprises the armature at an end distal to the contact portion, the trigger member being pivotally mounted at a point between the armature and contact portion.

Preferably, when the electromagnet is in an off or deactivated state, the armature magnet is attracted to the core of the electromagnet. More preferably, when the armature magnet is attracted to the core of the electromagnet, the trigger member is in the non-contact position.

The core of the electromagnet may be formed from a ferromagnetic material, such as iron or other ferrous material.

Preferably, when the electromagnet is in an on or activated state, the armature magnet is repelled from the core of the electromagnet. More preferably, when the armature magnet is repelled from the core of the electromagnet, the trigger member is in the contact position.

The tipping actuator may be configured such that the armature magnet is mounted on a surface of the armature facing towards the conveyor and the electromagnet is positioned between the conveyor and the armature. This provides for a compact arrangement and reduces the extent to which the tipping actuator extends outwards from the conveyor.

In some embodiments of the invention, the tipping actuator comprises upstream and downstream trigger member parts, each trigger member part being configured to effect tipping of the article carriers if positioned in their path, wherein the upstream trigger member part is able to move into the contact position upon actuation of the actuation mechanism if the downstream trigger member part is constrained from moving into the contact position. For example, the downstream trigger member may be constrained by the article carrier when tipped towards the trigger member.

In said embodiments, the first electromagnet may be configured to cause the upstream trigger member part to move between the contact and non-contact positions and the tipping actuator may comprise a further electromagnet comprising a further core switchable between on and off states to cause the downstream trigger member to move between the contact and non-contact positions. The further electromagnet may be operated in conjunction with, or independently from, the first electromagnet.

According to a fourth aspect of the invention, there is provided a tipping actuator for a conveyor system, the conveyor system comprising a plurality of article carriers moving on an endless conveyor in a conveying direction, each article carrier having a carrier frame for bearing an article, the carrier frame being pivotally mounted on the article carrier and operable to tip to enable discharge of the article borne on the carrier frame, the tipping actuator comprising:

a trigger member having a contact portion for contacting the article carriers; and an actuation mechanism operable to move the trigger member between a non-contact position, in which the contact portion is positioned out of the path of the article carriers so as to avoid contact therewith, and a contact position, in which the contact portion is positioned in the path of the article carriers to make contact therewith and effect tipping thereof away from the trigger member, wherein the tipping actuator is operable to allow a first article carrier on the endless conveyor to be or have been tipped towards the trigger member and to effect tipping of a second article carrier on the endless conveyor away from the trigger member, the second article carrier being the article carrier on the endless conveyor immediately following the first article carrier.

Preferably, the trigger member comprises upstream and downstream trigger member parts, each trigger member part being configured to effect tipping of the article carriers if positioned in their path, wherein the upstream trigger member part is able to move into the contact position upon actuation of the actuation mechanism if the downstream trigger member part is constrained from moving into the contact position. For example, the downstream trigger member may be constrained by the article carrier when tipped towards the trigger member.

More preferably, each trigger member part comprises at least one contact surface for contacting the article carriers sloped towards the conveying direction and having at least two gradients.

The upstream and downstream trigger member parts may be independently operable.

It will be apparent that the tipping actuators of any of the first, second, third or fourth aspects of the invention may be provided in combination with the tipping actuators of any of the other aspects of the invention.

According to a fifth aspect of the invention, there is provided a conveyor system comprising:

an endless conveyor configured to move in a conveying direction;

a plurality of article carriers mounted on the endless conveyor, each article carrier having a carrier frame for bearing an article, the carrier frame being pivotally mounted on the article carrier and operable to tip to enable discharge of the article borne on the carrier frame; and at least one tipping actuator according to any one or more of the first, second or third aspects of the invention mounted in operable relation to the article carriers.

Preferably, the conveyor system comprises at least two tipping actuators situated on opposing sides of the endless conveyor. More preferably, the two tipping actuators are positioned directly opposite one another.

The conveyor system may further comprise at least one discharge station at one or more locations along the endless conveyor for receiving articles from the article carriers. More preferably, each discharge station is positioned on the opposite side of the endless conveyor to the tipping actuator operable to cause articles to be discharged into the respective discharge station. More preferably still, at least two discharge stations are positioned directly opposite one another.

Further aspects of the invention, which should be considered in all its novel aspects, will become apparent to those skilled in the art upon reading of the following description which provides at least one example of a practical application of the invention.

BRIEF DESCRIPTION OF THE DRAWINGS

One or more embodiments of the invention will be described below by way of example only, and without intending to be limiting, with reference to the following drawings, in which.

DETAILED DESCRIPTION OF PREFERRED EMBODIMENTS OF THE INVENTION

Figure 1:
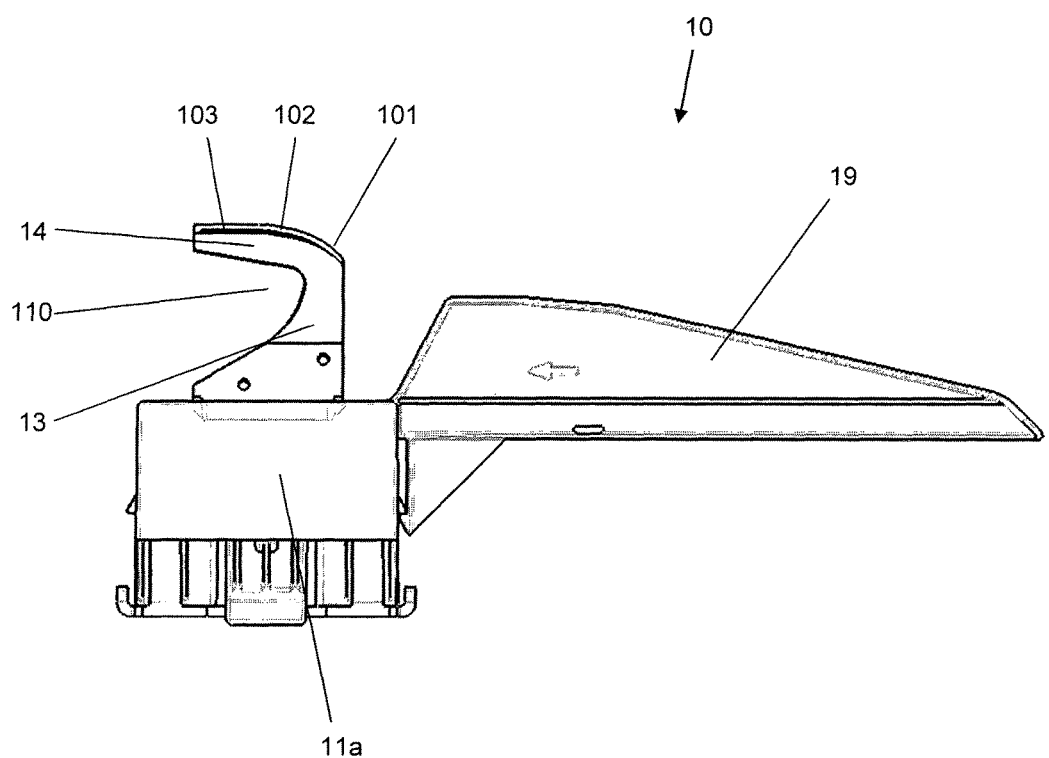
FIG. 1 is a side view illustration of a tipping actuator according to an embodiment of the invention.

Throughout the following description, unless specifically indicated otherwise, like reference numerals refer to like components.

Tipping Actuator

Figure 2:
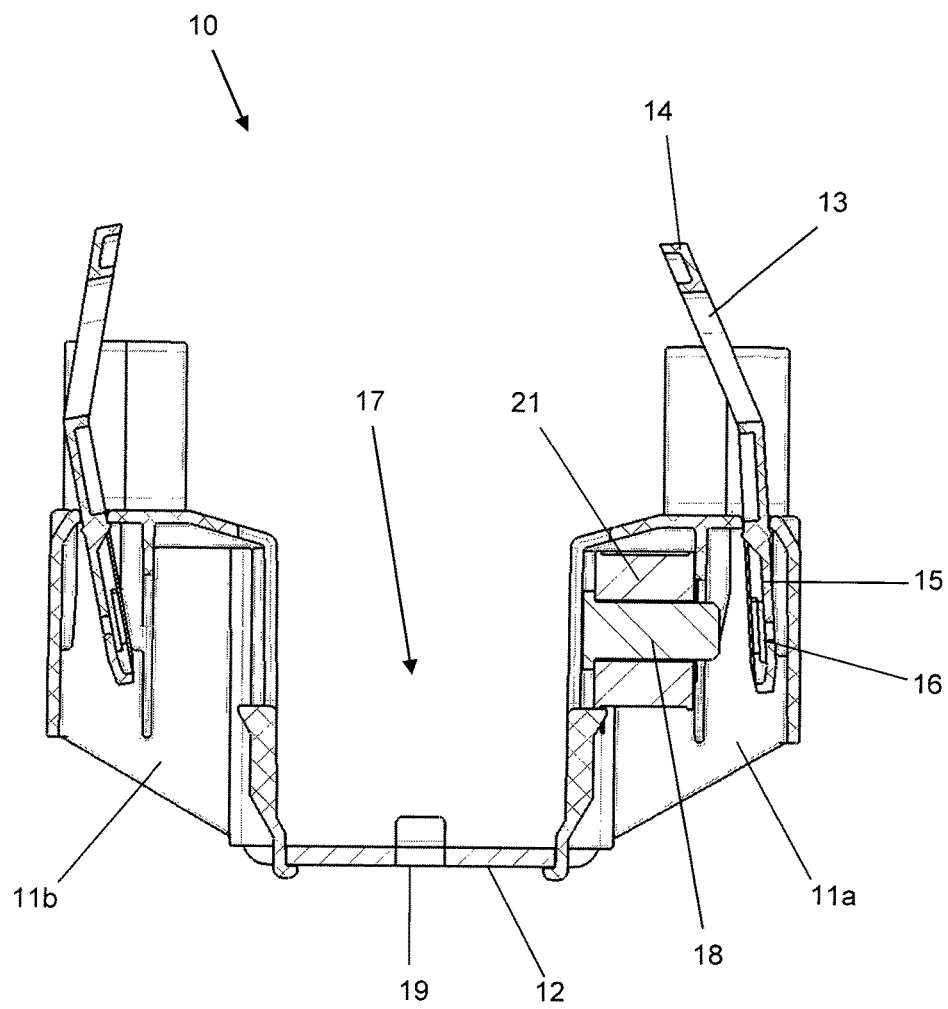
FIG. 2 is a cross-sectional view illustration of the tipping actuator shown in FIG. 1.

FIG. 1 is a side view illustration of a tipping actuator 10 according to an embodiment of the invention. FIG. 2 is a cross-sectional view illustration of the tipping actuator 10 shown in FIG. 1.

Tipping actuator 10 comprises a housing 11a adapted to be mounted on the side of an endless conveyor. In the embodiment shown, the tipping actuator 10 further comprises another housing 11b adapted to be mounted on the opposite side of the conveyor to housing 11a. Housings 11a and 11b may be joined in some way, for example by a bracket 12. The two sides of tipping actuator 10 may be formed and may function in exactly the same way so, for the purposes of the following description, only one side of the tipping actuator will be described although the same description may also apply to the other side of the actuator. It is noted that not all components of the left hand side of tipping actuator 10 are illustrated in FIG. 2. In alternative embodiments of the invention, the tipping actuator comprises only one of the sides of the tipping actuator shown in FIG. 2.

Between the two sides of tipping actuator 10 is formed a conveyor channel 17 through which an endless conveyor is able to pass.

Tipping actuator 10 comprises a trigger member 13 pivotally mounted on the housing 11a and extending upwards therefrom. The upper portion of the trigger member 13 comprises a contact portion 14, which will be described in detail later. The end of the trigger member 13 distal from the contact portion 14 comprises an armature 15, which comprises or has mounted thereon a magnet 16. Trigger member 13 is able to pivot about a point between the armature 15 and contact portion 14 by virtue of its mounting in housing 11a. The trigger member is thus able to move between a contact position, in which the contact portion 14 is positioned inwardly as shown on the right hand side of FIG. 2, and a non-contact position, in which the contact portion is positioned outwardly as shown on the left hand side of FIG. 2.

Inside housing 11a there is an electromagnet having a magnetic (for example a ferromagnetic or ferrous) core 18 with a solenoid 21 wound around it. The electromagnet is able to be switched on and off by a control device to cause the fixed pole magnet 16 to be repelled from and attracted to the electromagnet, which moves the trigger member 13.

Figure 3:
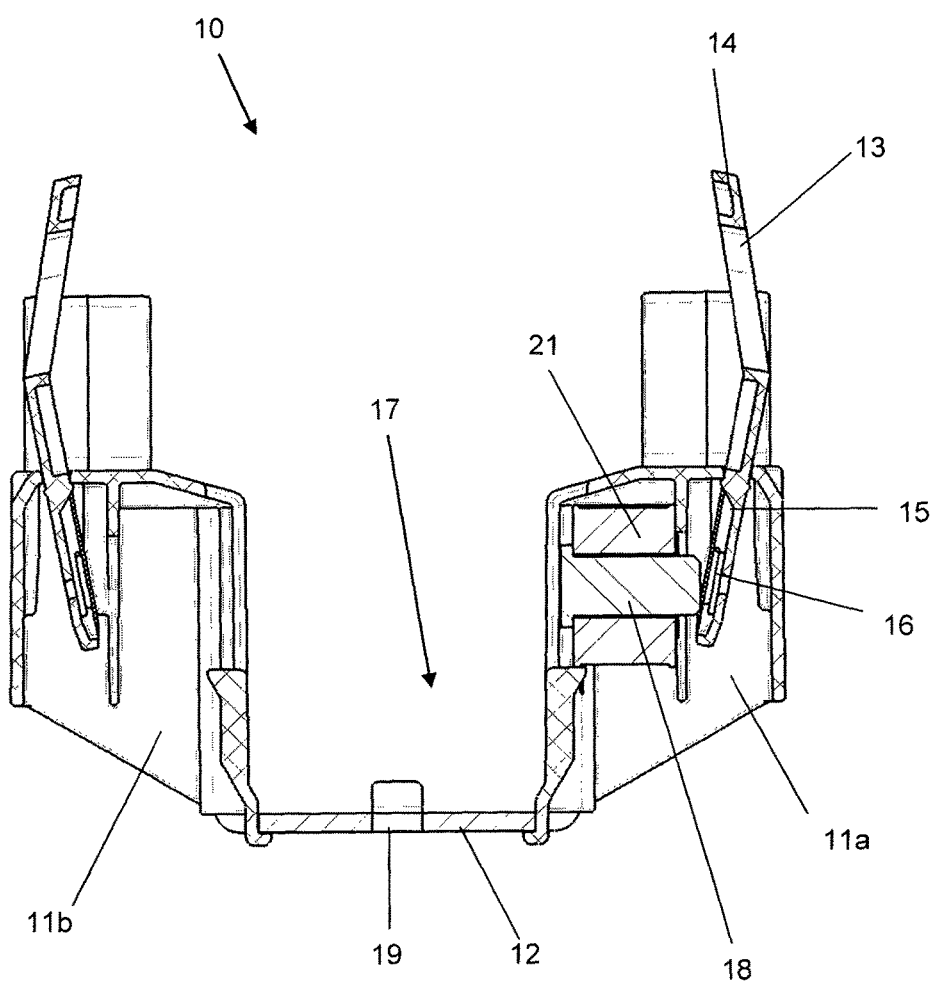
FIG. 3 is a cross-sectional view illustration of the tipping actuator shown in FIG. 2 in an alternative configuration.

FIG. 3 is a cross-sectional view illustration of the tipping actuator 10 shown in FIG. 2 but with the trigger member in the non-contact position rather than the contact position (which is shown in FIG. 2).

The default position for the trigger member 13 is the non-contact position as shown in FIG. 3, in which the magnet 16 is attracted to the magnetic core 18 of the electromagnet. Since magnet 16 is a permanent magnet, no energy is required to maintain the trigger member in the non-contact position.

To actuate the trigger member 13 into the contact position shown in FIG. 2, the electromagnet is energised by a suitable control device. The solenoid winding 21 is configured to cause the electromagnet to repel magnet 16, i.e. by causing the electromagnet to be formed with a pole at the outwards facing end that is the same as the pole of the magnet 16 at the inwards facing end. Repulsion between the electromagnet and magnet 16 causes the armature 15 to move away from the electromagnet and the trigger member to move into the contact position shown in FIG. 2.

This trigger actuation mechanism is highly robust and will only fail if the fixed polarity magnet loses its magnetism. The mechanism therefore has a longer lifespan compared to actuation mechanisms using a spring or the like to bias the trigger to its default position. A spring is vulnerable to fatigue and clogging with small components. In addition, the mechanism described herein has only a single bearing surface that contacts the article carriers, which reduces susceptibility to wear compared to mechanisms with more bearing surfaces.

While any type of magnet or electromagnet may be used, in one exemplary embodiment, the magnet 16 is a fixed polarity magnet. A fixed polarity magnet may be used on account of its high remanence, or strength. It will be understood that the "magnetic core" of the electromagnet is a core formed from any material that is attracted to a magnet.

In the embodiment shown in FIGS. 2 and 3, one example of a trigger member actuation mechanism is illustrated but it will be evident that other arrangements are also possible without departing from the scope of the invention. For example, while the trigger member 13 moves laterally between the contact and non-contact positions in the embodiment shown, the trigger member may alternatively be oriented differently and move in another direction between the said positions. In another example, the pivot axis could be arranged vertically rather than horizontally.

In the embodiment of FIGS. 2 and 3, the trigger member 13 comprises the armature 15 as an integral part thereof. It will be apparent that, in other embodiments, the armature may be mechanically coupled to the trigger member in another appropriate manner.

Furthermore, in the embodiment of FIGS. 2 and 3, the electromagnet is positioned between the conveyor channel 17 and the armature 15 with the magnet 16 mounted on a surface of the armature facing the conveyor channel 17. This arrangement provides a compact lateral extent of the tipping actuator 10, meaning the width that the actuator protrudes out the side of the conveyor is reduced. When conveyors are situated adjacent to one another, minimal lateral extent means articles from adjacent conveyors have more room to be discharged. However it will be apparent that, in other embodiments, other arrangements are possible. For example, the trigger member may be pivotally attached at a bottom end, with the magnet positioned above the pivot.

In some embodiments, the solenoid of the electromagnet may be surrounded by a metal casing, for example made from a sheet metal material. When made from a ferromagnetic material, the metal casing may help to channel magnetic flux produced by the electromagnet to increase the efficiency of the solenoid. Insulating material may be disposed between the solenoid and the metal casing to mitigate the possibility of sparking.

In some embodiments, the housing 11a in which the actuation mechanism is housed may also be made from a similar sheet metal material to further increase the efficiency of the electromagnet. In fact, it has been found that constructing the components of the actuation mechanism such that a magnetic circuit is formed, e.g. by making many components of the actuation mechanism from a ferrous material, increases the strength of the electromagnet and therefore the acceleration of the trigger. This reduces the time taken for the trigger to move into the path of an article carrier, increasing the tolerance of the system to timing errors.

A ramp 19 may be comprised as part of the tipping actuator 10 or as a separate component. The arrow on the ramp 19 shown in FIG. 1 indicates the conveying direction of the conveyor with which tipping actuator 10 is configured to be used. As such, the ramp 19 is located upstream of the trigger member 13 in relation to the conveying direction. The ramp 19 slopes upwards in the downstream direction and its function will be described below. In some embodiments, the ramp may be integrally formed with the housing 11a.

Conveyor System

Figure 4:
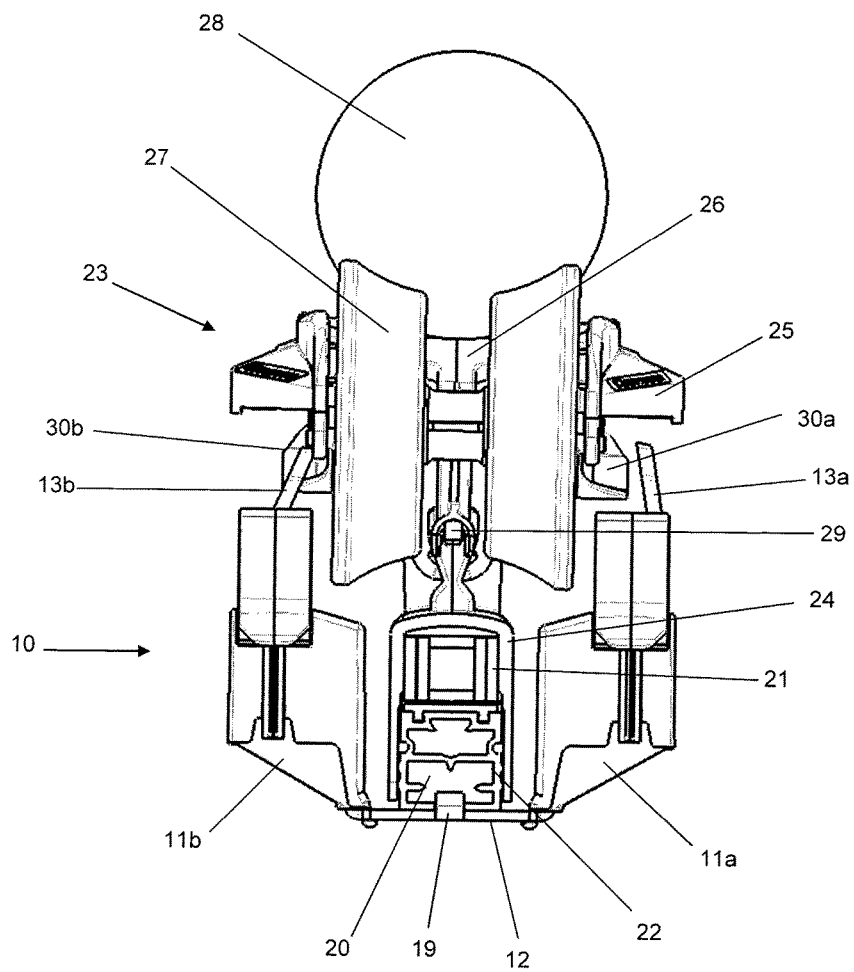
FIG. 4 is a rear view illustration of the tipping actuator shown in FIGS. 1 to 3 in use with an endless conveyor according to one embodiment of the invention.
Figure 9:
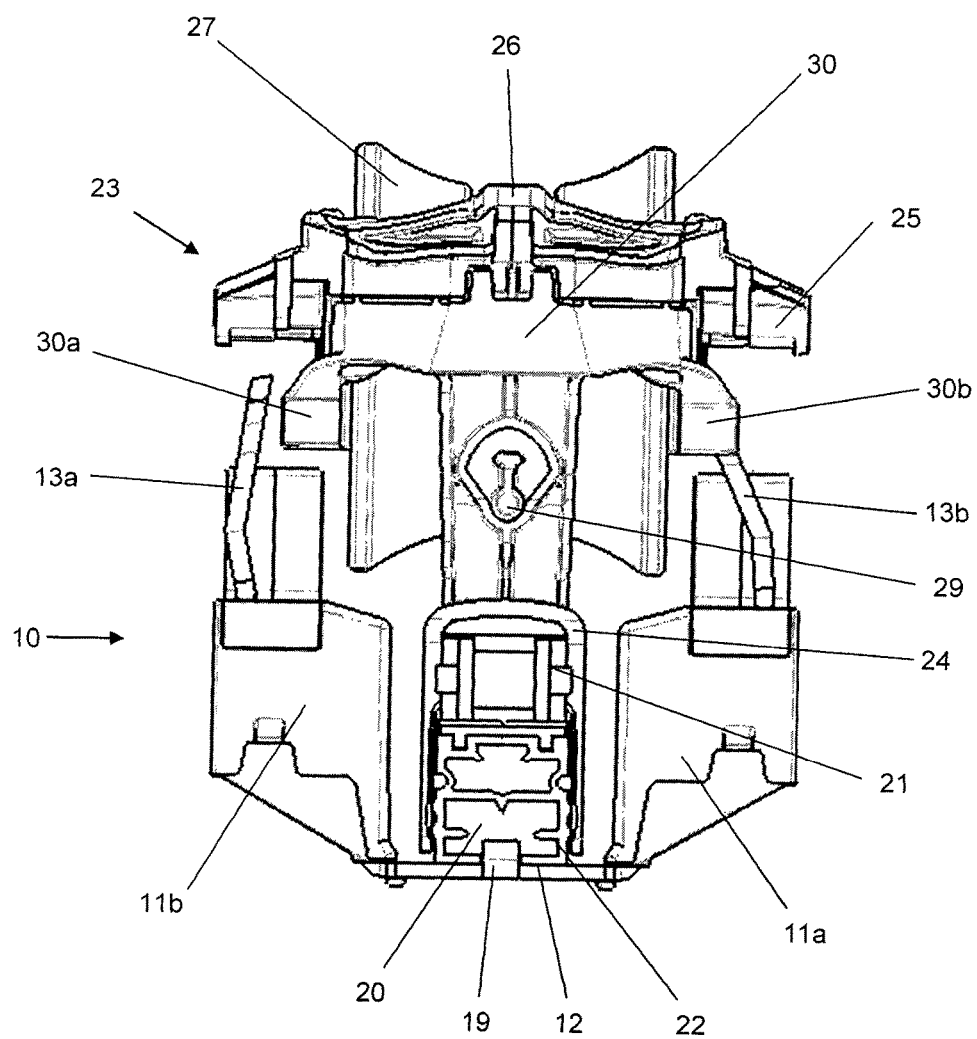
FIG. 9 is a front view illustration of the tipping actuator shown in FIG. 4 without an article being supported by the article carrier.

FIG. 4 is a rear view illustration of the tipping actuator 10 shown in FIGS. 1 to 3 in use with an endless conveyor 20 according to one embodiment of the invention. FIG. 9 is a front view illustration of the same tipping actuator and conveyor without an article being supported by the article carrier. The tipping actuator 10 is mounted on the endless conveyor 20 by means of a fixing 19, for example a screw, so that the conveyor passes through the conveyor channel 17 between the tipping actuator housings 11a and 11b. The endless conveyor 20 may be formed in any suitable manner, but in the embodiment shown comprises a series of chain links 21 joined end-to-end and operable to move around a conveyor extrusion 22.

Mounted on the endless conveyor 20 is a plurality of article carriers 23, of which one is shown in FIG. 4. The article carriers 23 are mounted on the conveyor in any appropriate manner, for example by means of a mounting clip 24. Each article carrier comprises a carrier frame 25, which in turn includes a support surface 26 and rollers 27 which together define a cup for bearing an article 28.

The carrier frame 25 is mounted on the mounting clip 24 by means of a pivotal connection 29. This allows the carrier frame 25 to move between a carriage position, in which the support surface 26 is generally horizontal and article 28 is supported by the article carrier, and a discharge position, in which carrier frame 25 has tipped from the carriage position so that the support surface 26 is not horizontal and the article 28 discharges from the article carrier under gravity. The carrier frame is shown in the carriage position in FIG. 4. Pivotal connection 29 may comprise a stop to limit the extent to which the carrier frame 25 can pivot.

As described in the applicant's U.S. Pat. No. 7,410,044, the article carrier 23 or carrier frame 25 may comprise a latch or locking member 30 that is moveable between two different positions. In one position of the locking member, the carrier frame 25 is unable to pivot on the mounting clip 24 by virtue of an appropriate pivot locking mechanism. This is referred to as the locked carriage configuration. In the second position of the locking member, the carrier frame is free to pivot as has been described and the locking mechanism is released. This is referred to as the unlocked carriage configuration. In exemplary embodiments, the carrier frame is in the locked carriage configuration when the locking member is in a low position on the mounting clip and can be raised into the unlocked position by, for example, a portion of trigger member 13.

When the locking member is in the unlocked position, the carrier frame is able to be tipped by means of a trigger actuator such as those according to embodiments of the invention described herein. Some part of the locking member 30 or, in other embodiments some part of the carrier frame, presents a surface able to be contacted by the trigger actuator to effect the tipping. In the embodiment shown in FIG. 4, locking member 30 comprises lever arms 30a and 30b that extend sideways outwards from the article carrier and comprise a contact surface on their undersides able to be contacted by the contact portions 14 of trigger members 13. The locking member 30 is contacted and pushed upwards against the carrier frame 25 to cause the carrier frame to tip.

Operation of the Tipping Actuator

Figure 5:
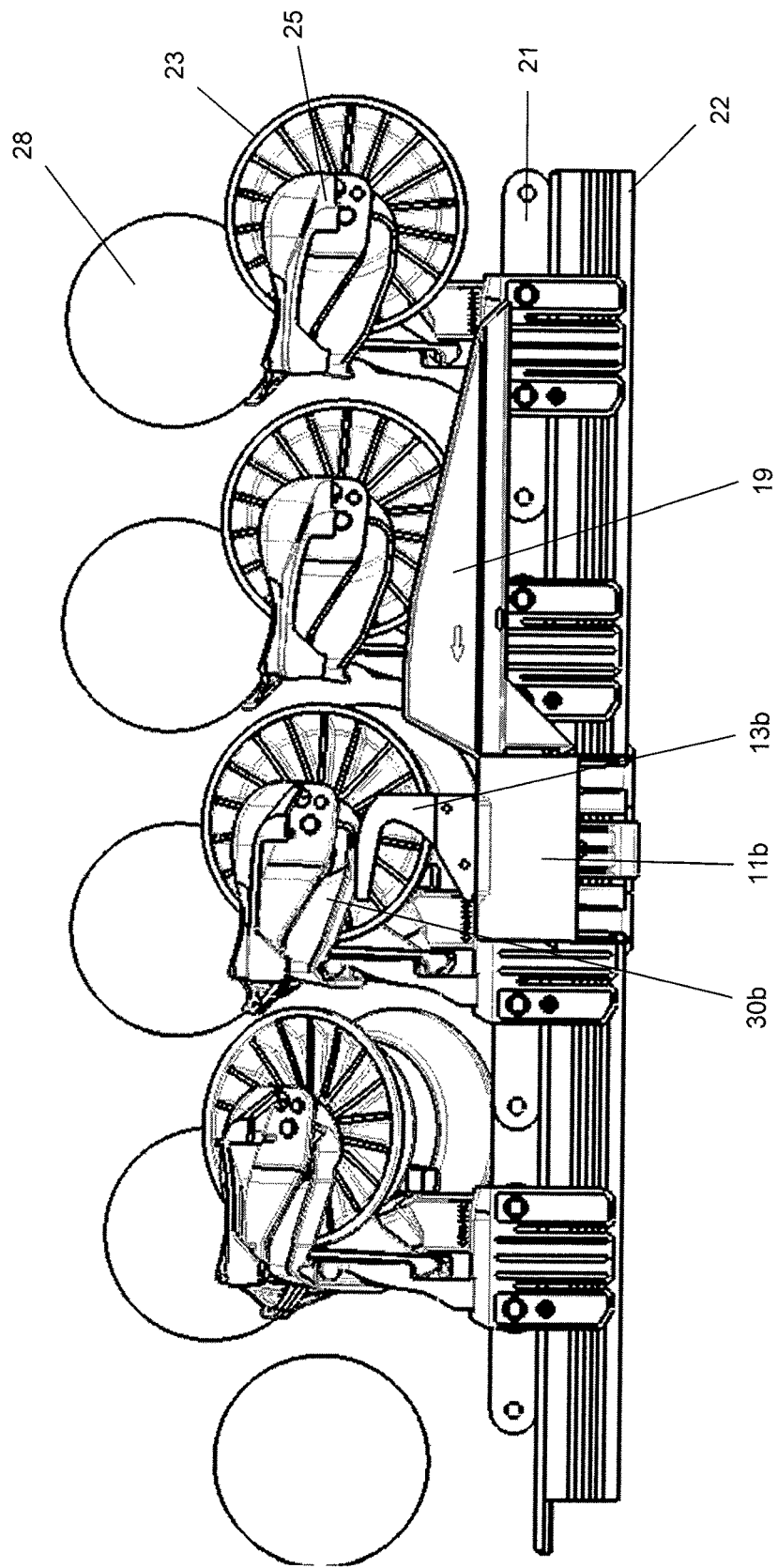
FIG. 5 is a side view illustration of the conveyor system shown in FIG. 4.
Figure 6:
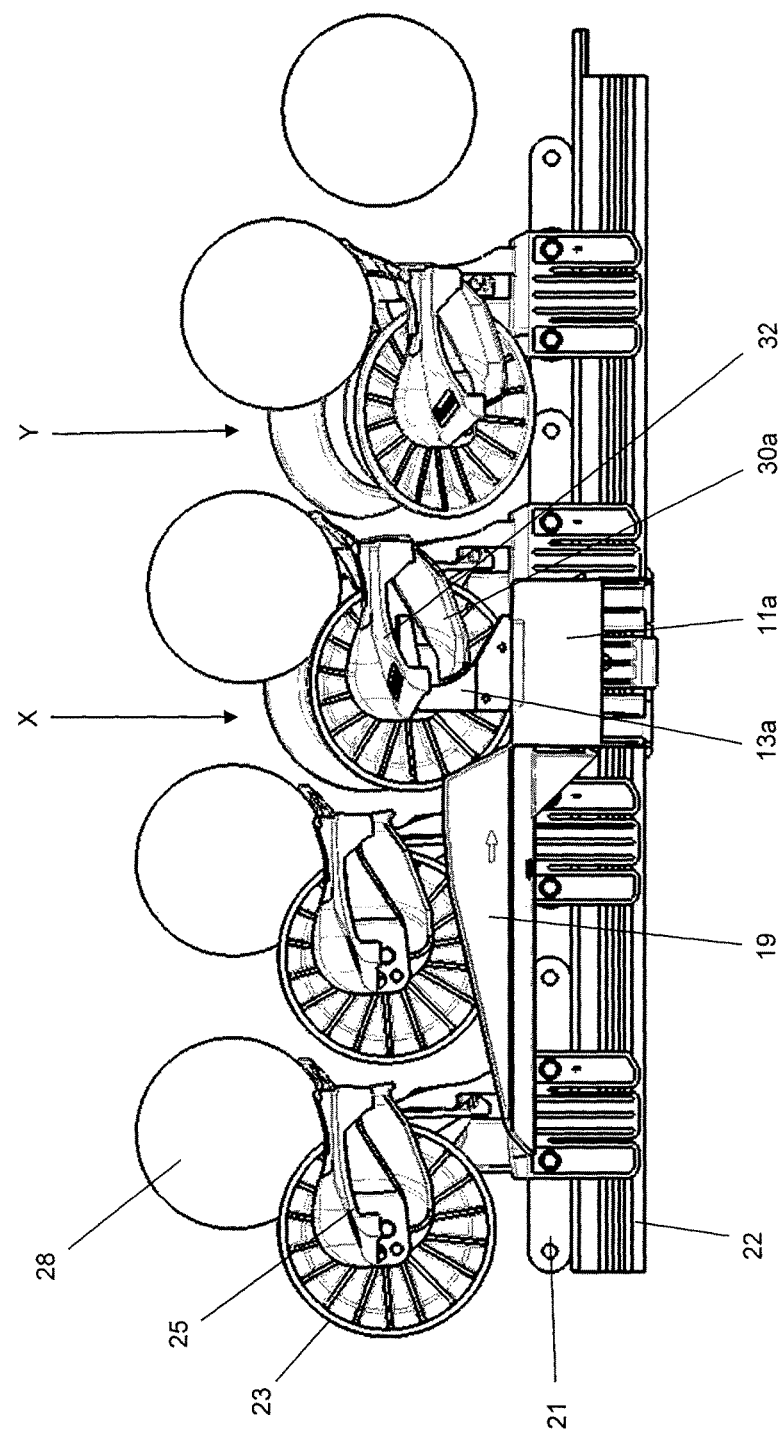
FIG. 6 is another side view illustration of the conveyor system shown in FIG. 4.

Operation of the tipping actuator 10 will be now be described in relation to FIG. 4 and FIGS. 5 and 6, which are side view illustrations of the conveyor system shown in FIG. 4. FIG. 5 illustrates the system from one side and FIG. 6 is an illustration from the other side. In both FIGS. 5 and 6, the passage of a single article carrier 23 is represented by a time progression of positions as it travels on the conveyor.

By default, the trigger members are in the non-contact position, for example as is shown by trigger member 13a in FIGS. 4 and 6. That is, the trigger member 13a is positioned out of the path of the article carriers, and in particular out of the path of the lever arm of the locking member 30, so contact is avoided as the article carrier 23 moves past the trigger member 13a. For example, the arrangement of the trigger actuation mechanism shown in FIG. 2 results in the trigger member 13a being situated laterally outside the path of the article carriers.

Each trigger member is able to be selectively actuated into the contact position in which it lies in the path of the next article carrier 23 passing by on the conveyor by control of the associated electromagnet. Trigger member 13b of FIGS. 4 and 5 is shown in the contact position. As can be seen most clearly in FIG. 5, the trigger member 13b is dimensioned such that, when it is in the contact position, the article carrier is impinged by the trigger member and the contact surface on the underside of the lever arm 30b is contacted by the upper surface of the contact portion of trigger member 13a. This causes the locking member 30 to be pushed upwards on the side nearest trigger member 13b to unlock the carrier frame 25 and further to cause the carrier frame to tip away from the trigger member 13b and to discharge the article 28 on the opposite side of the conveyor to the trigger member 13b.

In contrast to the applicant's existing system described in the Background to the Invention section of this document, which has a trigger member that flicks upwards to impact against the article carriers to effect their tipping, the present invention requires less energy to actuate the trigger member to cause tipping of the article carriers because the trigger member needs to move through a smaller distance to be activated. This also makes the present invention significantly less noisy when in operation than the existing system. In addition, the energy that causes the carrier to tip in the invention is generated by the conveyor itself—it is the motion of the conveyor against the trigger member that causes the tipping action. The discharge of different weight articles can therefore be controlled by controlling the speed of the conveyor without altering the actuation of the trigger. For example, to prevent light articles flying off the conveyor, the conveyor can be slowed slightly. The possibility of heavy articles being failed to be discharged by a trigger mechanism lacking sufficient energy is also avoided since the energy causing the discharge comes from the motion of the conveyor.

The locking member 30 comprises lever arms on both sides so that trigger members can be positioned on both sides of the conveyor and the article carriers can be tipped in either direction to discharge articles on either side of the conveyor. This may be useful when sorting or grading produce as more outlets can be situated in the same conveyor space compared to if the conveyor could only discharge articles on one side. It may be particularly useful to situate trigger members directly opposite each other on the conveyor. In this configuration, the carrier frame 25 moves towards trigger member 13a when it is tipped away from trigger member 13b. This presents a risk that the trigger member on the side the carrier frame is tipped towards could prevent the carrier frame tipping properly.

To address this, the tipping members, when in the non-contact position, are configured and positioned to avoid contact with the carrier frames when a carrier frame is tipped towards it. In one example, the tipping members are sufficiently far away from the conveyor in the non-contact position that the carrier frames do not contact them. However, this results in a wide conveyor system, which impacts on the number of conveyors able to be situated in a given area, and a trigger member that has to move a large distance between the contact and non-contact positions, which may require more energy and greater movement time compared to a more compact conveyor. Therefore, in some embodiments of the invention, such as shown in FIG. 6, the trigger member 13a is configured to be received by a portion of the carrier frame when the carrier frame 25 is tipped towards the trigger member. That is, trigger member 13a fits under a laterally extending arm 32 of the support surface 26 in the gap formed between the lateral extension 32 and the carrier frame. As a result, trigger member 13a does not prevent the carrier frame from tipping. In this embodiment, the conveyor system is compact in its width and, as shown in FIG. 4, the trigger actuator may not extend outwards beyond the width of the carrier frame 25.

It can be seen in FIG. 6 that, shortly after the trigger member 13b has contacted the lever arm 30b (as shown by the article carrier in position X), the article carrier has partly tipped towards trigger member 13a and, as described above, the configuration and position of trigger member 13a allows such partial tipping. In some embodiments, the trigger member 13a in the non-contact position may be configured to prevent full tipping of the article carrier until the article carrier has moved forwards on the conveyor to position Y. This may be desirable since an initial partial tipping of the article carrier followed by a full tipping may make the tipping movement gentler than if the article carrier was allowed to immediately tip fully. This may ensure articles are discharged from the conveyor without excessive violence, increasing the chances of the article being discharged to the intended destination, for example an outlet chute.

The embodiments of trigger actuators according to the invention shown in the Figures are tailored for use with one of the applicant's existing conveyor systems. There are significant advantages for those already using the applicant's conveyor systems to benefiting from the advantages of the invention without the need to replace the conveyor systems. However the invention is not limited to use only with the applicant's own systems, which are illustrated herein by way of example only. It will be apparent that trigger actuators within the scope of the invention may be designed to operate with any appropriate conveyor system.

Profile of the Trigger

Referring again to FIG. 1, the contact portion 14 of the trigger member 13 will now be discussed in more detail. The upper surface of the contact portion 14 is the part of the trigger member 13 that contacts the article carriers to effect their tipping. The contact surface generally slopes upwards in the conveying direction so that the surface slopes towards the conveying direction. This slope allows the lever arm of the article carrier to be contacted and pushed upwards by the trigger member.

The shape of the contact surface is configured to ease contact between the trigger member 13 and the article carriers. Embodiments of the invention comprise a contact surface having at least two gradients, for example the contact surface may comprise two or more near-straight sections, as shown in the embodiment of FIG. 1, or the contact surface may be curved.

In the embodiment of FIG. 1, the contact surface comprises three surface sections 101, 102 and 103. First surface section 101 is on the upstream end of the contact surface of the trigger member 13 and is the lowest of the three sections. It also has the steepest gradient. This section is designed to make first contact with the locking member lever arm of an article carrier that impinges on the trigger member. In embodiments in which the article carrier comprises a carrier frame that can transition between locked and unlocked carriage configurations by means of moving the locking member vertically between locked and unlocked positions, the first surface section 101 is of sufficient height to lift the locking member from the locked to the unlocked position.

Second surface section 102 transitions the gradient of the contact surface between the first surface section 101 and the third surface section 103, which is the highest of the three sections and has the shallowest gradient. The third surface section is at a sufficient height to lift the locking member lever arm of the article carrier so that the article carrier tips over, as has been described above.

This stepped or gradual reduction in gradient of the contact surface of the trigger assists in controlling tipping of the article carrier. Rather than an impact that could cause articles on the carrier to get thrown off, the contact surface first unlocks the article carrier and then causes a gradual tipping.

It will be evident that the invention includes embodiments in which separate triggers are provided, one which causes the unlocking of the article carrier and another that causes the tipping. However the use of a single trigger to perform both actions may be more efficient and less complex to construct.

Trigger Member Recess

As shown in FIG. 1, a recess 110 may be provided in an upstream portion of the trigger member 13. The trigger member 13 is generally hook-shaped, with the point of the hook pointing upstream and the recess 110 formed by the hook.

Figure 7:
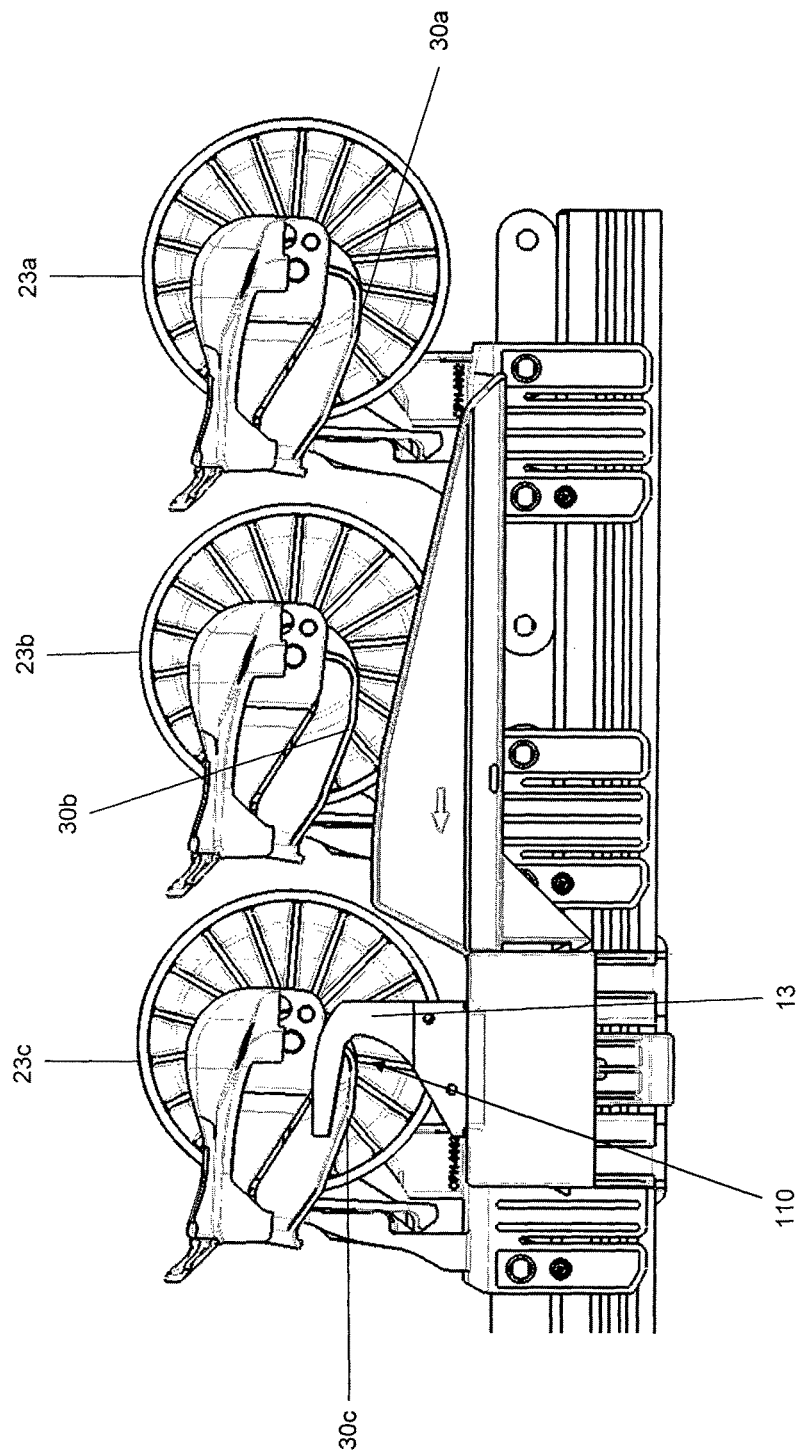
FIG. 7 is another side view illustration of the conveyor system shown in previous figures.

One purpose of the recess 110 will now be described with reference to FIG. 7, which is another side view illustration of the conveyor system shown in previous figures. Unlike FIGS. 5 and 6, FIG. 7 illustrates three article carriers 23a, 23b and 23c mounted one after another on the conveyor system. Trigger member 13 is shown in the non-contact position and allows the article carriers to pass by unimpinged.

Trigger member 13 is at the same height as the locking member lever arms 30 of the article carriers 23 so that, when in the contact position the trigger member contacts the lever arm of the next article carrier and causes it to tip. This limits the window of opportunity available to actuate the trigger prior to the arrival of the article carrier that needs to be tipped. The trigger can only be actuated once the lever arm of the previous article carrier, which may not need to be tipped, has passed by.

In the embodiment shown in the Figures, the lever arm 30 comprises a thin flange extending laterally out of the side of the carrier frame. As shown in FIG. 7, when an article carrier is in the position of article carrier 23c, it has sufficiently passed by the trigger member 13 for the trigger member to close without contacting the lever arm 30. This is possible because the shape of the recess 110 of the trigger member 13 compliments the shape of lever arm 30. Therefore the trigger member can be actuated as soon as the article carrier has got to the position of carrier 23c. This increases the tolerance in the timing of actuation compared to a similar system in which the recess 110 is not present and the trigger member extends downwards from the hooked end. Such a tolerance in timing of actuation reduces the accuracy and complexity required in the control system and also allows the operation of the conveyor system to tolerate variations in timing over the course of time, for example the tendency for conveyors to stretch slightly with prolonged use.

Ramp

As mentioned above with reference to FIG. 1, the tipping actuator 10 may comprise a ramp 19 located upstream from the trigger member 13. The purpose of ramp 19 will now be described with reference to FIG. 8, which is a side view illustration of the conveyor system shown in the other figures with a single article carrier 23 shown in a number of different positions corresponding to its movement to the left in FIG. 8 over time.

Figure 8:
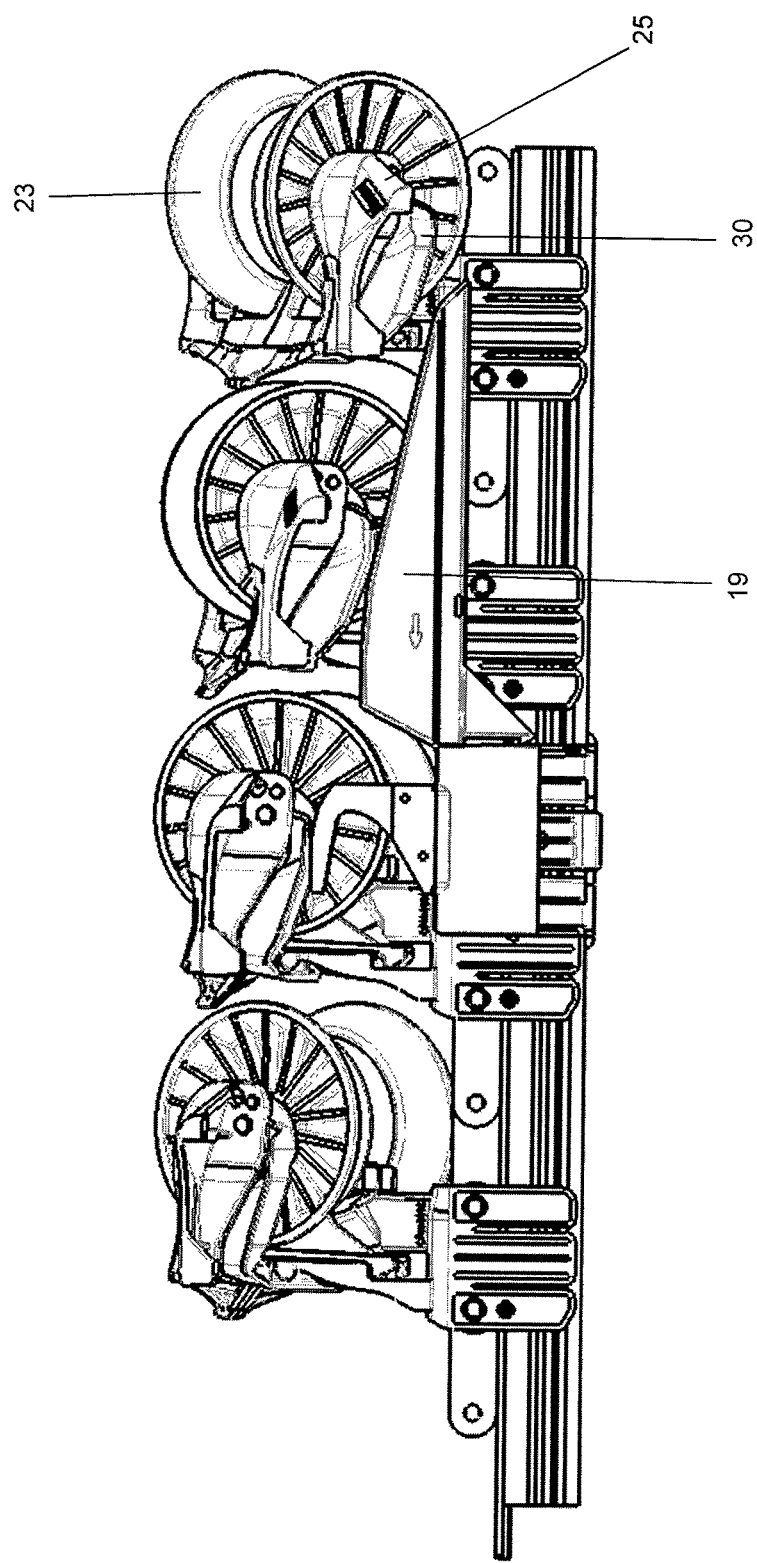
FIG. 8 is another side view illustration of the conveyor system shown in the other figures.

In FIG. 8, article carrier 23 is initially in the discharge or tipped position (shown on the right hand side of FIG. 8). The article carrier 23 may have tipped accidently or have been tipped by an upstream tipping actuator. Ramp 19 rights the tipped article carrier. That is, it causes the article carrier 23 to move from the article discharge or tipped position into the article carriage or non-tipped position. Ramp 19 is configured to engage the lever arm of the locking member 30 and slope upwards in the downstream direction to sufficient height for the carrier frame 25 to be stably brought into the carriage position. The shallow gradient of ramp 19 ensures the carrier frame is not righted with too much momentum which could cause the carrier frame to tip in the opposite direction.

It will be appreciated that ramps may be positioned at any point along the conveyor system where the article carriers need to be righted and not only immediately upstream of a tipping actuator.

Using ramps to right the article carriers helps to reduce wear and increase the lifespan of a conveyor system. If many article carriers are left tipped for a long stretch of a conveyor, their weight may affect the balance of the conveyor and cause wear on one side.

Double Trigger Actuator

In a conveyor system, tipping one article carrier in one direction and the immediately following article carrier in the opposite direction may be problematic. The tipping actuator for the latter article carrier may only be activated once the first article carrier (that is tipped towards the tipping actuator) has passed. This is because the tipping actuator may be impeded by a part of the article carrier. This therefore gives a short period of time in which to activate the trigger and for the trigger to move into position to contact the following article carrier. The available period of time in which to activate the trigger may be particularly short where the speed of the conveyer is high or the spacing between article carriers is small.

In one embodiment of the invention, the positioning of the pivot of the actuator trigger is sufficiently high that the degree of movement of the trigger member is small and it can be moved into position quickly. However this may result in a high degree of tolerance being needed during manufacture and a smaller tolerance to wear, meaning that tipping malfunctions are likely to happen sooner prior to parts needing to be replaced.

Figure 10:
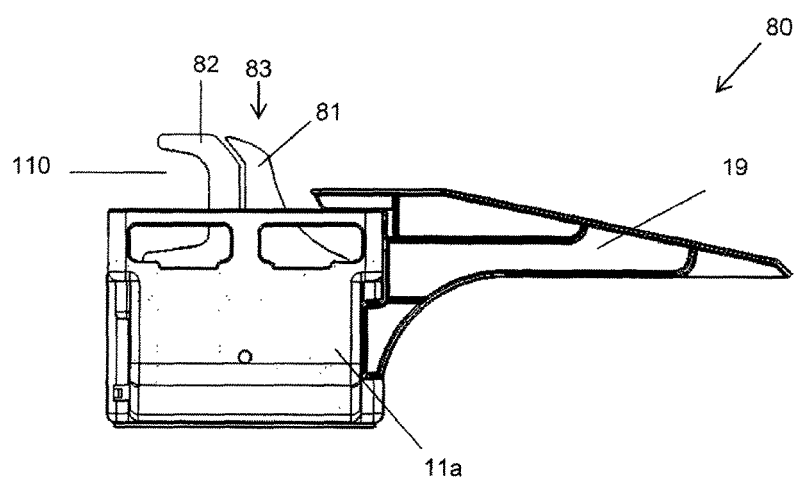
FIG. 10 is a side view illustration of a tipping actuator according to another embodiment of the invention.

FIG. 10 is a side view illustration of a tipping actuator 80 according to another embodiment of the invention. Tipping actuator 80 is similar in many respects to tipping actuator 10 shown in FIG. 1 and like references are used in relation to like parts. In the following, only those parts of tipping actuator 80 differing from tipping actuator 10 will be described.

The trigger member 83 of tipping actuator 80 comprises an upstream trigger member part 83 and a downstream trigger member part 82. Each of the upstream and downstream trigger member parts 81 and 82 is configured to cause tipping of the article carriers if positioned in their path, as described above.

Figure 11:
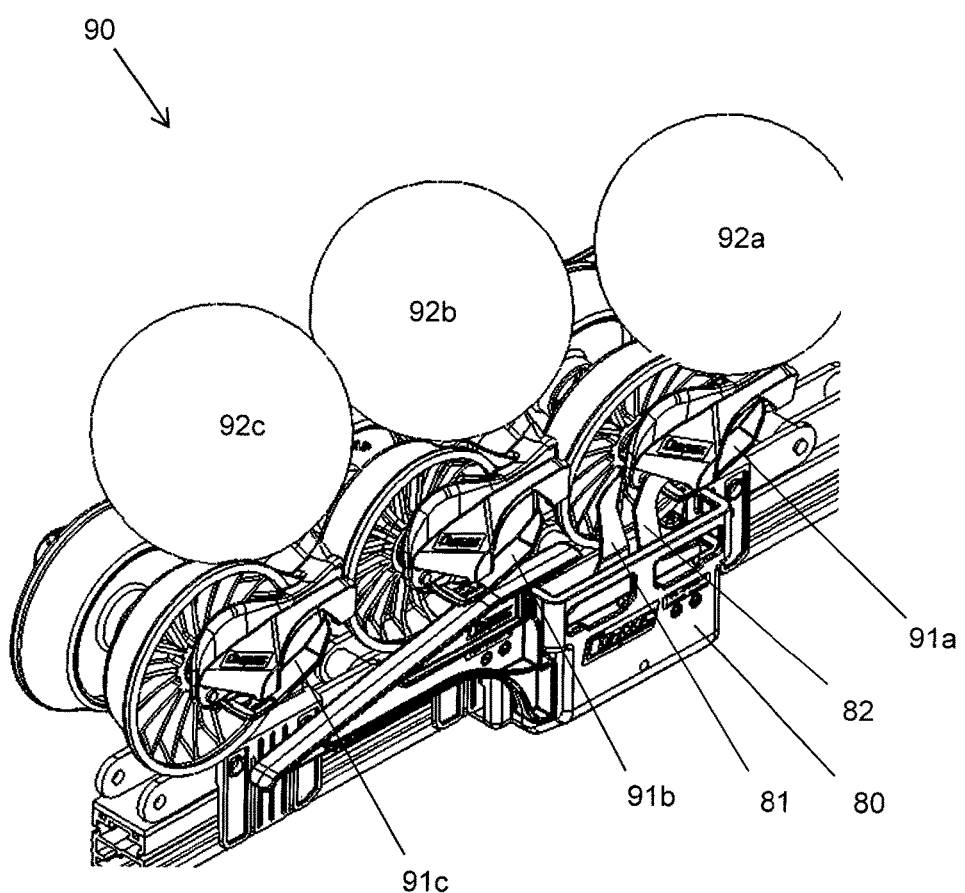
FIG. 11 is an isometric view illustration of a conveyor system according to one embodiment of the invention.

In operation, upstream trigger member part 81 is able to move into position to contact an article carrier even if downstream trigger member part 82 is constrained from moving. Such a situation is illustrated in FIG. 11, which is an isometric view illustration of a conveyor system 90 according to one embodiment of the invention. In FIG. 11, the article carriers 91 are moving diagonally away and to the right. Article carrier 91a has been tipped towards tipping actuator 80 by another tipping actuator on the other side of the conveyor (not shown in FIG. 11) so that article 92a is falling off the conveyor towards the tipping actuator 80. However, article 92b on carrier 91b needs to be tipped in the other direction, i.e. away from tipping actuator 80, and therefore tipping actuator 80 is actuated.

To ensure the trigger member of tipping actuator 80 is moved into the path of carrier 91b in time to tip it over, tipping actuator 80 has been actuated while a part of carrier 91a is still level with the tipping actuator 80. The presence of carrier 91a when it is tipped towards tipping actuator 80 prevents all of the trigger member from moving into the path of the article carriers 91. However, at the point shown in FIG. 11, upstream trigger member part 81 is free to move into the path of the article carriers while downstream trigger member part 82 is still constrained from moving by the presence of article carrier 91a. As a result, upstream trigger member 81 is able to move early to ensure that article carrier 91b is tipped in the opposite direction to article carrier 91a.

In another embodiment of the invention, full actuation of the tipping actuator may be impeded by the roller part of the article carrier. In such an embodiment, the upstream trigger member may only be free to move into the path of the article carriers after the roller has moved sufficiently far downstream.

In a preferred embodiment of the invention, the upstream and downstream trigger member parts 81 and 82 are activated by separate electromagnets but the two electromagnets are activated together. In this embodiment, both trigger member parts are triggered together but they each only move into the contact position when they are not constrained from doing so. Therefore, in the situation described in relation to FIG. 11, the upstream trigger part 81 will move first, followed by the downstream trigger part 82.

In an alternative embodiment of the invention, the upstream and downstream trigger member parts may be able to be activated by separate actuation mechanisms. This may allow only the upstream trigger member to be triggered in a situation (such as the situation shown in FIG. 11) when constrained movement is likely, which may help to avoid damage to the trigger member, depending on the actuation mechanism used. In a still further embodiment, the upstream and downstream trigger members may selectively be operable together or independently.

The profile shape of trigger member 83 in the embodiment of FIG. 10 is similar to that of the trigger member 13 shown in FIG. 1 but the upstream and downstream trigger member parts 81 and 82 can be envisaged as being formed by splitting trigger member 13 vertically in two. The shape of the interface of gap between the upstream and downstream trigger member parts in FIG. 10 is such that the downstream trigger member 82 comprises an upper contact surface that is sloped towards the conveying direction and has at least two gradients, as has been described in more detail above. As a result, if the upstream trigger part 81 fails to activate (for whatever reason), the downstream trigger part 82 is shaped to tip the article carriers in a similar manner as described above in relation to the single trigger member embodiments of the invention. In the embodiment shown in FIG. 10, the interface or gap between the top of the upstream and downstream trigger parts 81 and 82 is at the point at which the upper contact surface of the trigger member 83 changes.

Control System to Sort/Grade

It will be understood that the conveyor system described herein may be used to sort or grade articles of any type although particular application may be found in the field of fruit sorting and grading.

A sorting or grading apparatus may comprise an endless conveyor of the type described above and a grading or sorting means such as a weighbridge, optical scanner or the like. A control system tracks the movement of the article carriers around the conveyor and activates trigger actuators to sort articles by certain characteristics, as measured by the grading or sorting means, by discharging articles of the same characteristics into the same discharge station, which may comprise a further conveyor, chute or other article receiving means.

As has been described, the present invention advantageously allows tipping actuators to be positioned on directly opposing sides of the endless conveyor to make efficient use space while still benefiting from other advantages of the invention described above or evident to the skilled addressee.

Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to".

The entire disclosures of all applications, patents and publications cited above and below, if any, are herein incorporated by reference.

Reference to any prior art in this specification is not, and should not be taken as, an acknowledgement or any form of suggestion that that prior art forms part of the common general knowledge in the field of endeavour in any country in the world.

The invention may also be said broadly to consist in the parts, elements and features referred to or indicated in the specification of the application, individually or collectively, in any or all combinations of two or more of said parts, elements or features.

Where in the foregoing description reference has been made to integers or components having known equivalents thereof, those integers are herein incorporated as if individually set forth.

It should be noted that various changes and modifications to the presently preferred embodiments described herein will be apparent to those skilled in the art. Such changes and modifications may be made without departing from the spirit and scope of the invention and without diminishing its attendant advantages. It is therefore intended that such changes and modifications be included within the present invention.

The invention claimed is:

1. A tipping actuator for a conveyor system, the conveyor system comprising a plurality of article carriers moving on an endless conveyor in a conveying direction, each article carrier having a carrier frame for bearing an article, the carrier frame being pivotally mounted on the article carrier and operable to tip to enable discharge of the article borne on the carrier frame, the tipping actuator comprising:
  trigger means having a trigger contact portion for contacting the article carriers, the trigger contact portion having an upstream end and a downstream end in relation to the conveying direction; and
  trigger actuation means operable to move the trigger means between a non-contact position, in which the trigger contact portion is positioned out of the path of the article carriers so as to avoid contact therewith, and a contact position, in which the trigger contact portion is positioned in the path of the article carriers to make contact with an article carrier contact portion of the article carriers and effect tipping of the article carriers away from the trigger means, wherein the trigger means is configured such that the trigger means can be actuated into the contact position while a first article carrier of the plurality of article carriers is adjacent the trigger means in a non-tipped position and before the article carrier contact portion of the first article carrier has completely passed the downstream end of the trigger contact portion without causing the trigger means to contact the first article carrier.

2. A tipping actuator as claimed in claim 1, wherein the trigger means is configured such that, when in the non-contact position, the article carriers are able to tip only partly towards the trigger means prior to contacting the trigger means, the article carriers being able to tip fully once conveyed past the trigger means.

3. A tipping actuator as claimed in claim 1, wherein the trigger actuation means is operable to move at least part of the trigger means laterally between the non-contact and contact positions.

4. A tipping actuator as claimed in claim 1, wherein the tipping actuator comprises a ramp located upstream of the trigger means and configured to move an article carrier from an article discharge (tipped) position into an article carriage (non-tipped) position.

5. A conveyor system as claimed in claim 1, wherein at least two discharge stations are positioned directly opposite one another.

6. A tipping actuator as claimed in claim 1, wherein the trigger means comprises a recess in an upstream portion thereof in relation to the conveying direction.

7. A tipping actuator as claimed in claim 6, wherein the recess is shaped to compliment the shape of the article carrier contact portion.

8. A tipping actuator as claimed in claim 1, wherein the trigger means is coupled to the trigger actuation means at an upstream portion thereof.

9. A tipping actuator as claimed in claim 8, wherein the trigger means comprises a generally hook-shaped trigger member with a point of the hook extending in the downstream direction.

10. A tipping actuator as claimed in claim 1, wherein the tipping actuator is operable to allow a first article carrier on the endless conveyor to be or have been tipped towards the trigger means and to effect tipping of a second article carrier on the endless conveyor away from the trigger means, the second article carrier being the article carrier on the endless conveyor immediately following the first article carrier.

11. A tipping actuator as claimed in claim 10, wherein the trigger means comprises upstream and downstream trigger member parts, each trigger member part being configured to effect tipping of the article carriers if positioned in their path, wherein the upstream trigger member part is able to move into the contact position upon actuation of the trigger actuation means if the downstream trigger member part is constrained from moving into the contact position.

12. A tipping actuator as claimed in claim 1 wherein the trigger contact portion comprises at least one contact surface sloped towards the conveying direction and having at least two gradients.

13. A tipping actuator as claimed in claim 12, wherein the trigger means comprises one sloped contact surface, the sloped contact surface having at least two gradients.

14. A tipping actuator as claimed in claim 13, wherein the sloped contact surface comprises at least a first section and a second section, the first section being located upstream of the second section in relation to the conveying direction, the first section having a steeper gradient than the second section.

15. A conveyor system comprising:
an endless conveyor configured to move in a conveying direction;
a plurality of article carriers mounted on the endless conveyor, each article carrier having a carrier frame for bearing an article, the carrier frame being pivotally mounted on the article carrier and operable to tip to enable discharge of the article borne on the carrier frame; and
at least one tipping actuator as claimed in claim 1 mounted in operable relation to the article carriers.

16. A conveyor system as claimed in claim 15, wherein the conveyor system comprises at least two tipping actuators situated on opposing sides of the endless conveyor.

17. A conveyor system as claimed in claim 16, wherein the two tipping actuators are positioned directly opposite one another.

18. A conveyor system as claimed in claim 15, wherein the conveyor system further comprises at least one discharge station at one or more locations along the endless conveyor for receiving articles from the article carriers.

19. A conveyor system as claimed in claim 18, wherein each discharge station is positioned on the opposite side of the endless conveyor to the tipping actuator operable to cause articles to be discharged into the respective discharge station.

20. A tipping actuator for a conveyor system, the conveyor system comprising a plurality of article carriers moving on an endless conveyor in a conveying direction, each article carrier having a carrier frame for bearing an article, the carrier frame being pivotally mounted on the article carrier and operable to tip to enable discharge of the article borne on the carrier frame, the tipping actuator comprising:
trigger means having at least one contact portion for contacting the article carriers; and
trigger actuation means operable to move the trigger means into a contact position, in which the contact portion(s) is positioned in the path of the article carriers to make contact therewith and effect tipping thereof,
wherein the contact portion(s) comprises at least one contact surface, the contact surface(s) comprising at least three surface sections of different gradients, the relative gradients of the at least three surface sections reducing in steepness in the conveying direction and wherein at least two of the surface sections slope upwards in the conveying direction.

21. A tipping actuator as claimed in claim 20, wherein the trigger means comprises a single sloped contact surface, the sloped contact surface comprising the at least three surface sections.

22. A tipping actuator as claimed in claim 21, wherein at least part of the sloped contact surface of the contact portion is curved.

23. A tipping actuator as claimed in claim 22, wherein the three surface sections are substantially straight and the sloped contact surface comprises a curved transition section between the adjacent surface sections.

24. A tipping actuator as claimed in claim 20, wherein the trigger means is configured such that, when a first surface section contacts the article carrier, a locking member of the article carrier is lifted from a locked position, in which the carrier frame is unable to pivot on the article carrier, into an unlocked position, in which the carrier frame is able to pivot on the article carrier.

25. A tipping actuator as claimed in claim 24, wherein the trigger means is configured such that, when a second surface section contacts the article carrier, the carrier frame is tipped from the unlocked position into an article discharge position.

26. A tipping actuator as claimed in claim 20, wherein the tipping actuator comprises upstream and downstream trigger member parts, each trigger member part being configured to effect tipping of the article carriers if positioned in their path, wherein the upstream trigger member part is able to move into the contact position upon actuation of the trigger actuation means if the downstream trigger member part is constrained from moving into the contact position.

27. A tipping actuator as claimed in claim 26, wherein each trigger member part comprises at least one of the contact surfaces for contacting the article carriers.

28. A tipping actuator as claimed in claim 26, wherein the upstream and downstream trigger member parts are independently operable.

29. A conveyor system comprising:
    an endless conveyor configured to move in a conveying direction;
    a plurality of article carriers mounted on the endless conveyor, each article carrier having a carrier frame for bearing an article, the carrier frame being pivotally mounted on the article carrier and operable to tip to enable discharge of the article borne on the carrier frame; and
    at least one tipping actuator as claimed in claim 20 mounted in operable relation to the article carriers.

30. A conveyor system as claimed in claim 29, wherein the conveyor system comprises at least two tipping actuators situated on opposing sides of the endless conveyor.

31. A conveyor system as claimed in claim 30, wherein the two tipping actuators are positioned directly opposite one another.

32. A conveyor system as claimed in claim 29, wherein the conveyor system further comprises at least one discharge station at one or more locations along the endless conveyor for receiving articles from the article carriers.

33. A conveyor system as claimed in claim 32, wherein each discharge station is positioned on the opposite side of the endless conveyor to the tipping actuator operable to cause articles to be discharged into the respective discharge station.

34. A conveyor system as claimed in claim 33, wherein at least two discharge stations are positioned directly opposite one another.

\* \* \* \* \*